United States Patent
Rico Alvarino et al.

(10) Patent No.: US 10,299,260 B2
(45) Date of Patent: May 21, 2019

(54) METHODS AND APPARATUS FOR FLEXIBLE BANDWIDTH OPERATION

(71) Applicant: QUALCOMM Incorporated, San Diego, CA (US)

(72) Inventors: Alberto Rico Alvarino, San Diego, CA (US); Hao Xu, San Diego, CA (US); Peter Gaal, San Diego, CA (US); Wanshi Chen, San Diego, CA (US); Renqiu Wang, San Diego, CA (US); Seyed Ali Akbar Fakoorian, San Diego, CA (US); Juan Montojo, San Diego, CA (US); Jing Lei, San Diego, CA (US); Yongbin Wei, La Jolla, CA (US); Arthur Miller, La Mesa, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/497,292

(22) Filed: Apr. 26, 2017

(65) Prior Publication Data

US 2017/0339677 A1    Nov. 23, 2017

Related U.S. Application Data

(60) Provisional application No. 62/339,724, filed on May 20, 2016.

(51) Int. Cl.
*H04W 72/00* (2009.01)
*H04W 72/04* (2009.01)
(Continued)

(52) U.S. Cl.
CPC ......... *H04W 72/042* (2013.01); *H04L 5/0007* (2013.01); *H04L 5/0053* (2013.01);
(Continued)

(58) Field of Classification Search
CPC .......... H04J 3/1694; H04J 3/00; H04J 11/005; H04J 14/08; H04J 11/0023; H04L 43/08;
(Continued)

(56) References Cited

U.S. PATENT DOCUMENTS

| 8,619,640 B2* | 12/2013 | Park | H04W 72/082 370/230 |
| 2003/0224731 A1* | 12/2003 | Yamaura | H04L 5/0048 455/63.3 |

(Continued)

OTHER PUBLICATIONS

International Search Report and Written Opinion—PCT/US2017/029902—ISA/EPO—Jul. 31, 2017.
(Continued)

*Primary Examiner* — Nimesh Patel
(74) *Attorney, Agent, or Firm* — Steven R. Thiel; Patterson & Sheridan

(57) ABSTRACT

Methods and apparatus for flexible bandwidth operation in a wireless communication network are provided. A User Equipment (UE) monitors a first set of resources for a first control channel in a first bandwidth region. In response, to detecting the first control channel, the UE monitors a second set of resources in a second bandwidth region for at least one of control information or data, the second bandwidth region larger than the first bandwidth region, wherein the monitoring the second set of resources for the control information includes monitoring the second set of resources for a second control channel for receiving the control information scheduling resources for receiving the data.

30 Claims, 12 Drawing Sheets

(51) Int. Cl.
| | |
|---|---|
| *H04W 76/15* | (2018.01) |
| *H04W 76/36* | (2018.01) |
| *H04M 1/725* | (2006.01) |
| *H04W 16/02* | (2009.01) |
| *H04W 36/08* | (2009.01) |
| *H04W 74/00* | (2009.01) |
| *H04L 5/00* | (2006.01) |
| *H04W 4/70* | (2018.01) |
| *H04W 84/04* | (2009.01) |
| *H04W 52/02* | (2009.01) |
| *H04W 72/12* | (2009.01) |
| *H04W 76/28* | (2018.01) |

(52) U.S. Cl.
CPC .......... *H04L 5/0091* (2013.01); *H04L 5/0094* (2013.01); *H04M 1/72511* (2013.01); *H04W 4/70* (2018.02); *H04W 16/02* (2013.01); *H04W 36/08* (2013.01); *H04W 74/006* (2013.01); *H04W 76/15* (2018.02); *H04W 76/36* (2018.02); *H04W 52/028* (2013.01); *H04W 52/0274* (2013.01); *H04W 72/1289* (2013.01); *H04W 76/28* (2018.02); *H04W 84/042* (2013.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/20* (2018.01); *Y02D 70/21* (2018.01); *Y02D 70/23* (2018.01); *Y02D 70/24* (2018.01); *Y02D 70/26* (2018.01)

(58) Field of Classification Search
CPC ... H04L 1/0025; H04L 5/0007; H04L 5/0037; H04L 1/1614; H04L 2001/0093; H04L 29/06027; H04L 5/0046; H04L 5/0064; H04L 65/80; H04W 4/005; H04W 28/06; H04W 48/12; H04W 72/042; H04W 16/28; H04W 72/04; H04W 72/0446; H04W 24/10; H04W 72/085; H04W 72/0453; H04W 72/082; H04W 16/10
See application file for complete search history.

(56) References Cited

U.S. PATENT DOCUMENTS

| | | | |
|---|---|---|---|
| 2009/0116599 A1* | 5/2009 | McCoy | H04J 11/0056 375/362 |
| 2013/0194997 A1* | 8/2013 | Zhu | H04L 5/0094 370/312 |
| 2015/0257118 A1* | 9/2015 | Siomina | G01S 5/021 455/456.1 |
| 2016/0105891 A1 | 4/2016 | Li et al. | |
| 2016/0127991 A1 | 5/2016 | Ang et al. | |
| 2016/0127997 A1 | 5/2016 | Ang et al. | |
| 2016/0128056 A1 | 5/2016 | Jiang et al. | |
| 2016/0302092 A1 | 10/2016 | Sartori et al. | |

OTHER PUBLICATIONS

Rico-Alvarino A., et al., "An Overview of 3GPP Enhancements on Machine to Machine Communications", IEEE communications Magazine, Jun. 2016, pp. 14-21.
International Preliminary Report on Patentability; PCT/US2017/029902; dated Apr. 17, 2018.
Chapter II Demand and Amendment under PCT Article 34 dated Mar. 19, 2018; PCT/US2017/029902.
Written Opinion of the International Preliminary Examining Authority dated Jul. 30, 2018; PCT/US2017/029902.

* cited by examiner

METHODS AND APPARATUS FOR FLEXIBLE BANDWIDTH OPERATION

This application claims priority to U.S. Provisional Application Ser. No. 62/339,724, entitled "METHODS AND APPARATUS FOR FLEXIBLE BANDWIDTH OPERATION", filed on May 20, 2016, which is expressly incorporated by reference in its entirety.

FIELD

The present disclosure relates generally to wireless communication, and more particularly, to methods and apparatus for flexible bandwidth operation in a wireless communicant network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a User Equipment (UE). The method generally includes monitoring a first set of resources for a first control channel in a first bandwidth region, and in response to detecting the first control channel, monitoring a second set of resources in a second bandwidth region for at least one of control information or data, the second bandwidth region larger than the first bandwidth region, wherein the monitoring the second set of resources for the control information comprises monitoring the second set of resources for a second control channel for receiving the control information scheduling resources for receiving the data.

Certain aspects of the present disclosure provide a method for wireless communications by a Base Station (BS). The method generally includes transmitting control information using at least a first set of resources for a first control channel in a first bandwidth region, and transmitting, based on the control information, at least one of additional control information or data using a second set of resources in a second bandwidth region larger than the first bandwidth region, wherein the additional control information is transmitted using at least a portion of the second set of resources for a second control channel, the additional control information scheduling resources for transmitting data.

Certain aspects of the present disclosure provide an apparatus for wireless communications by a User Equipment (UE). The apparatus generally includes means for monitoring a first set of resources for a first control channel in a first bandwidth region, and means for monitoring, in response to detecting the first control channel, a second set of resources in a second bandwidth region for at least one of control information or data, the second bandwidth region larger than the first bandwidth region, wherein the monitoring the second set of resources for the control information comprises monitoring the second set of resources for a second control channel for receiving the control information scheduling resources for receiving the data.

Certain aspects of the present disclosure provide an apparatus for wireless communications by a Base Station (BS). The apparatus generally includes means for transmitting control information using at least a first set of resources for a first control channel in a first bandwidth region, and means for transmitting, based on the control information, at least one of additional control information or data using a second set of resources in a second bandwidth region larger than the first bandwidth region, wherein the additional control information is transmitted using at least a portion of the second set of resources for a second control channel, the additional control information scheduling resources for transmitting data.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (e.g., LTE-whitespace), etc.

DETAILED DESCRIPTION

Figure 1:
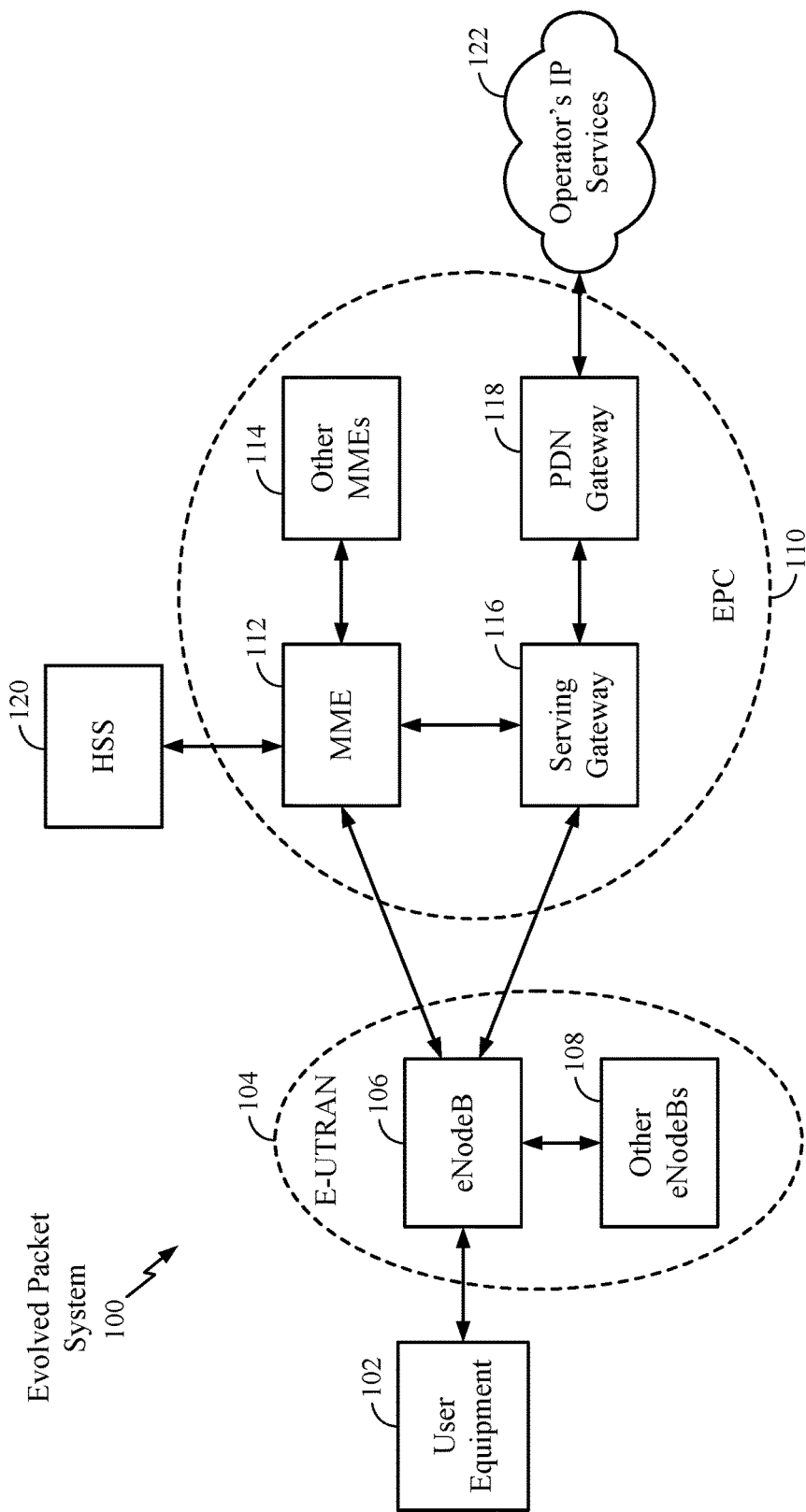
FIG. 1 is a diagram illustrating an example of a network architecture.

In some cases, certain devices, which generally operate in narrowband (e.g., eMTC (enhanced Machine Type Communications, NB-IoT (Narrow Band Internet of Things) type devices), may require higher data rates not achievable in narrowband operation. An example of such a use case may include voice applications which generally require higher bandwidth. However, higher data rates (e.g., as supported in wideband operation) generally come at the expense of higher device complexity and higher power consumption. In certain aspects, while for some of these devices (e.g., wearable devices such as high end watches) complexity may not be an issue, power consumption may be a limiting factor. In an aspect, from power consumption perspective, it may be better for a device to support higher data rates and go to sleep earlier.

The power consumption of a UE may be driven by the time the UE spends monitoring the control channel. For example, a UE may spend a high percentage of its time monitoring the control channel without any assignment. Examples of such monitoring include monitoring the control channel during DRX (Discontinuous Reception) cycles and for paging. To perform this monitoring of the control channel, the UE may incur unnecessary power consumption. For example, during wideband operation, the UE may have to monitor the entire bandwidth (e.g., 20 MHz) to decode PDCCH (Physical Data Control Channel) even when the UE may not have any assignment. Another example of unnecessary power consumption is when the UE has two or more of its RX (Receive) antennas turned on even in good coverage to monitor the control channel, when it may not be necessary to have multiple antennas turned on.

Certain aspects of the present disclosure discuss techniques to enable devices (e.g., UEs) to achieve higher data rates while keeping the power consumption to a minimum. Some of these techniques discuss flexible bandwidth change, including a device switching between different bandwidth sizes on a need basis. For example, a device may operate in a narrowband mode (e.g., Resource Blocks (RBs) in eMTC mode) while monitoring for a control channel to save power, and may switch to a wideband mode (e.g., 50RBs or any predefined bandwidth) to receive data at higher data rates. Accordingly, such techniques provide an acceptable tradeoff between power consumption and performance of the devices, by avoiding unnecessary power wastage while monitoring for the control channel and allowing for higher bandwidth (higher data rate) operation only when it is needed. In certain aspects, for additional power savings a device may turn off one or more RX antennas when operating in a narrowband mode and turn the antennas back on for operating in a wideband mode.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These communications networks are merely listed as examples of networks in which the techniques described in this disclosure may be applied; however, this disclosure is not limited to the above-described communications network.

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn attention, especially in the uplink (UL) communications where lower PAPR greatly benefits the wireless node in terms of transmit power efficiency.

An access point ("AP") may comprise, be implemented as, or known as NodeB, Radio Network Controller ("RNC"), eNodeB (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some implementations, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), a wearable device, a drone, a robot/robotic device, or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, etc.), medical/healthcare devices or equipment, biometric sensors/devices, an entertainment device (e.g., music device, video device, satellite radio, gaming device, etc.), a vehicular component or sensor, meters, sensors, industrial manufacturing equipment, a positioning device (e.g., GPS, Glonass, Beidou, terrestrial-based, etc.), a drone, a robot/robotic device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication(s) (MTC) UEs, which may include remote devices, that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, etc. MTC UEs, as well as other types of UEs, may be implemented as NB-IoT (narrowband internet of things) devices.

FIG. 1 is a diagram illustrating an LTE network architecture 100 in which aspects of the present disclosure may be practiced.

In certain aspects, a UE (e.g., UE 102) monitors a first set of resources for a first control channel in a first bandwidth region. In response to detecting the first control channel, the UE monitors a second set of resources in a second bandwidth region larger than the first bandwidth region.

In certain aspects, a Base Station (BS) (e.g., eNB 106 or one of the other eNBs 108) transmits control information using at least a first set of resources for a first control channel in a first bandwidth region. The BS transmits, based on the control information, at least one of additional control information or data using a second set of resources in a second bandwidth region larger than the first bandwidth region.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, a camera/security camera, a gaming device, a wearable device (e.g., smart watch, smart glasses, smart ring, smart bracelet, smart wrist band, smart jewelry, smart clothing, etc.), any other similar functioning device, etc. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
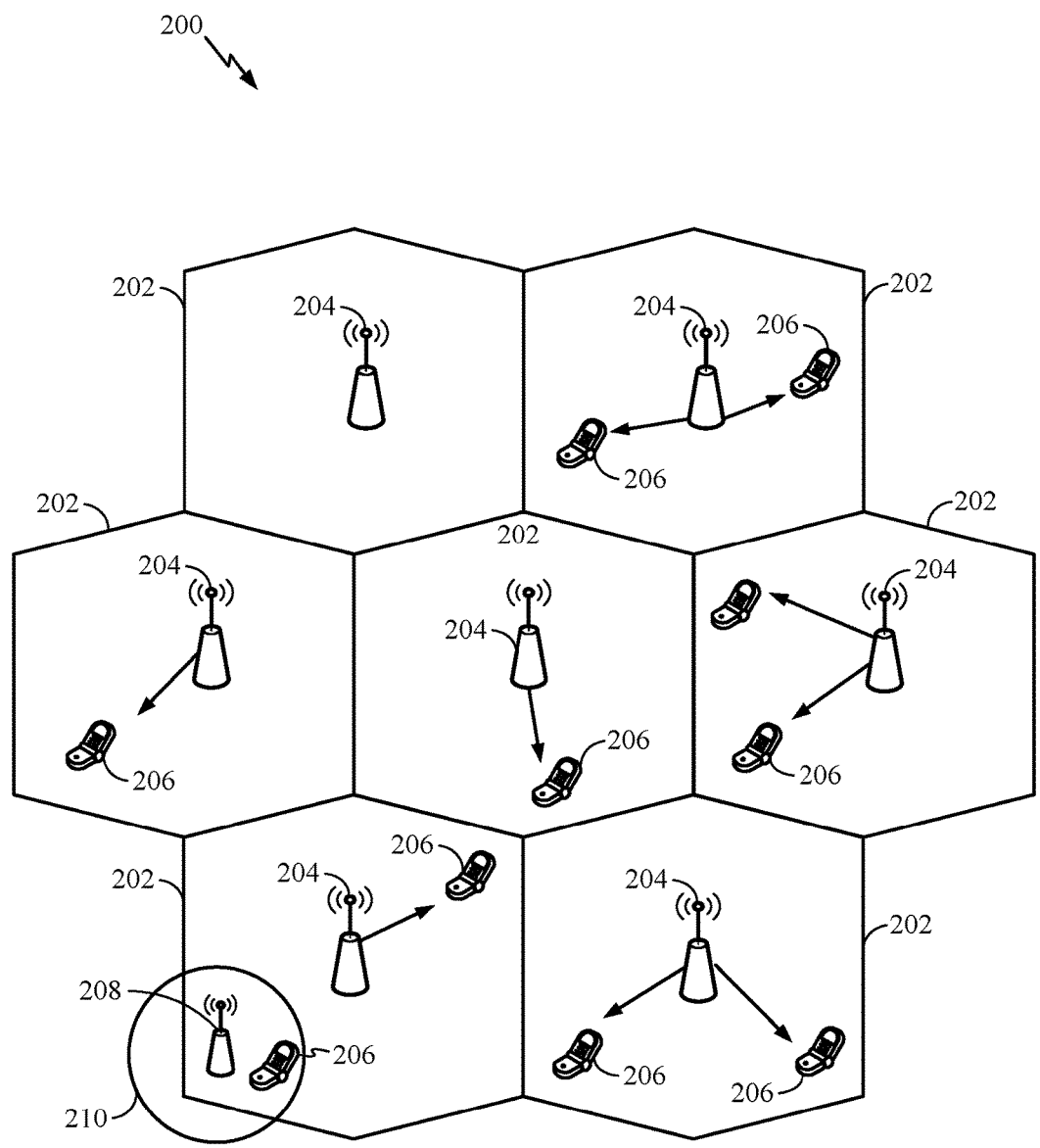
FIG. 2 is a diagram illustrating an example of an access network.

FIG. 2 is a diagram illustrating an example of an access network 200 in an LTE network architecture in which aspects of the present disclosure may be practiced. For example, UEs 206 and eNBs 204 may be configured to implement techniques for flexible bandwidth operation in accordance with certain aspects of the present disclosure.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network may be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
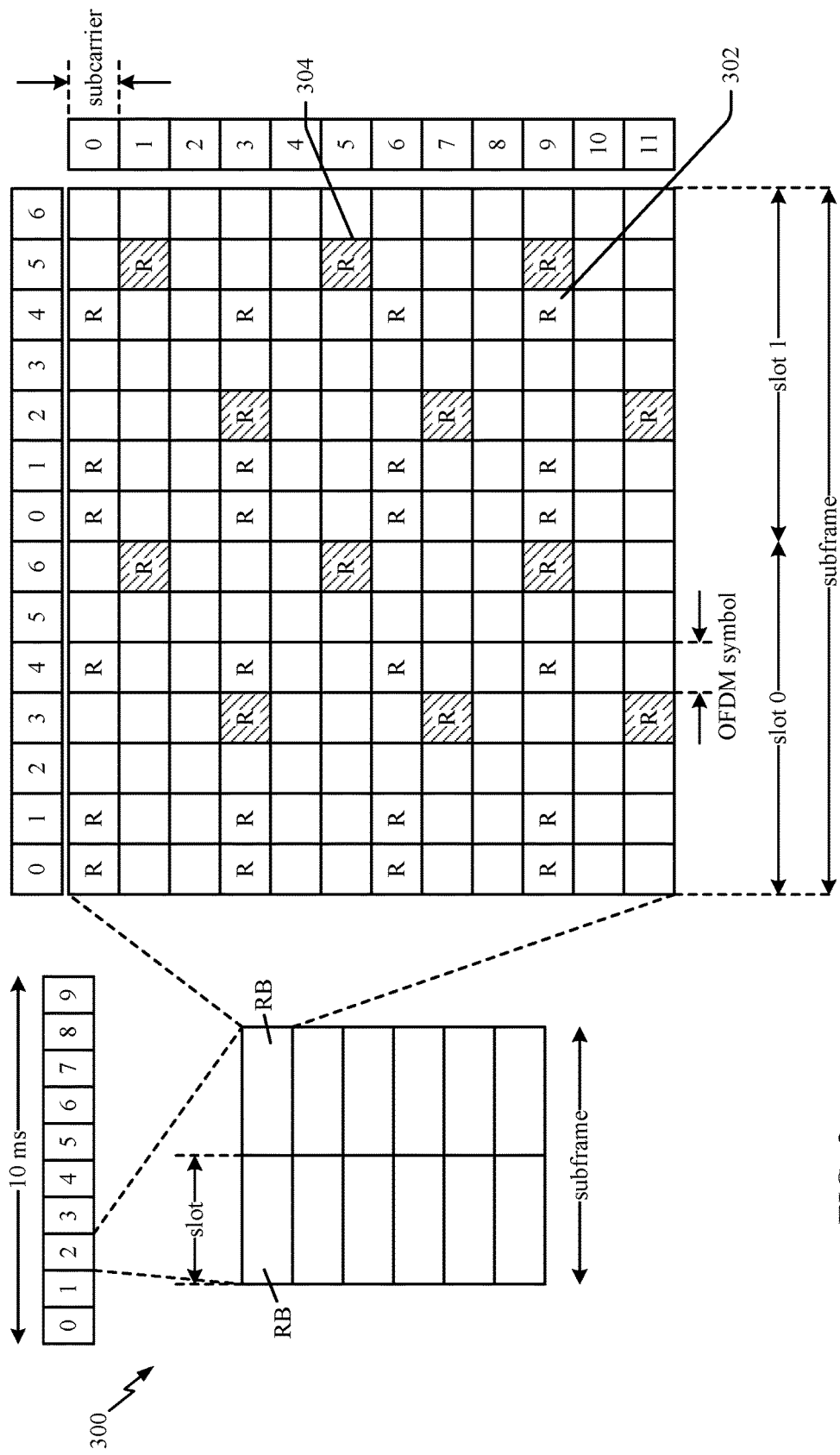
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
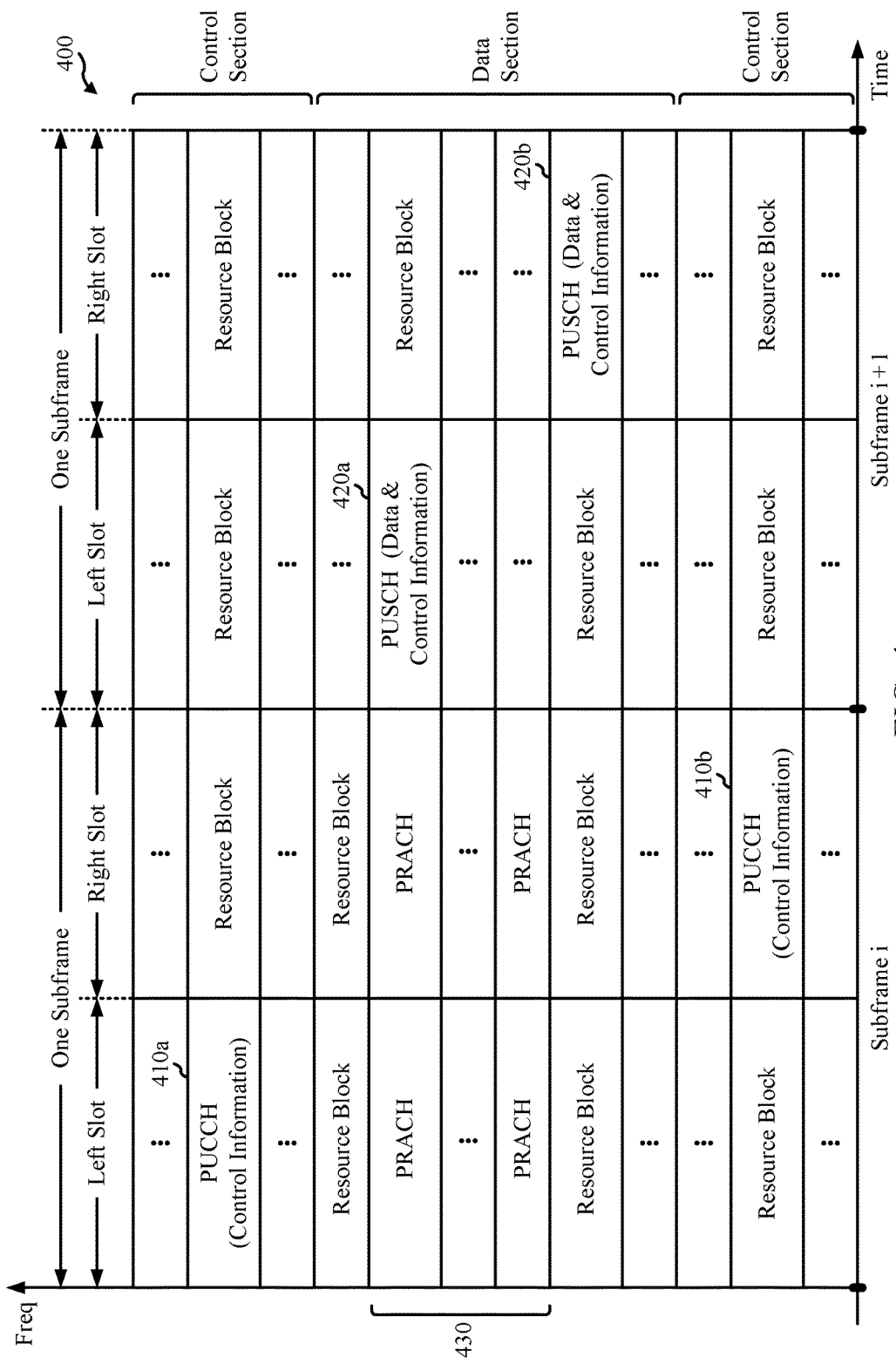
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
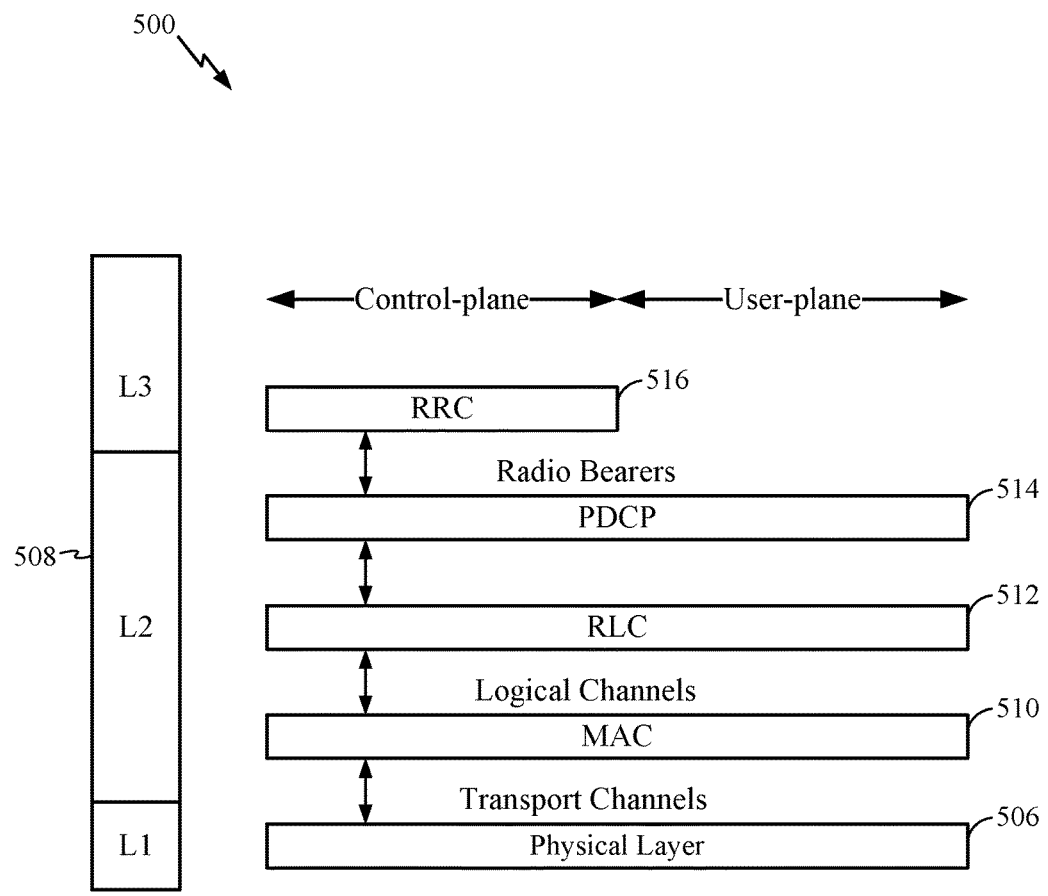
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
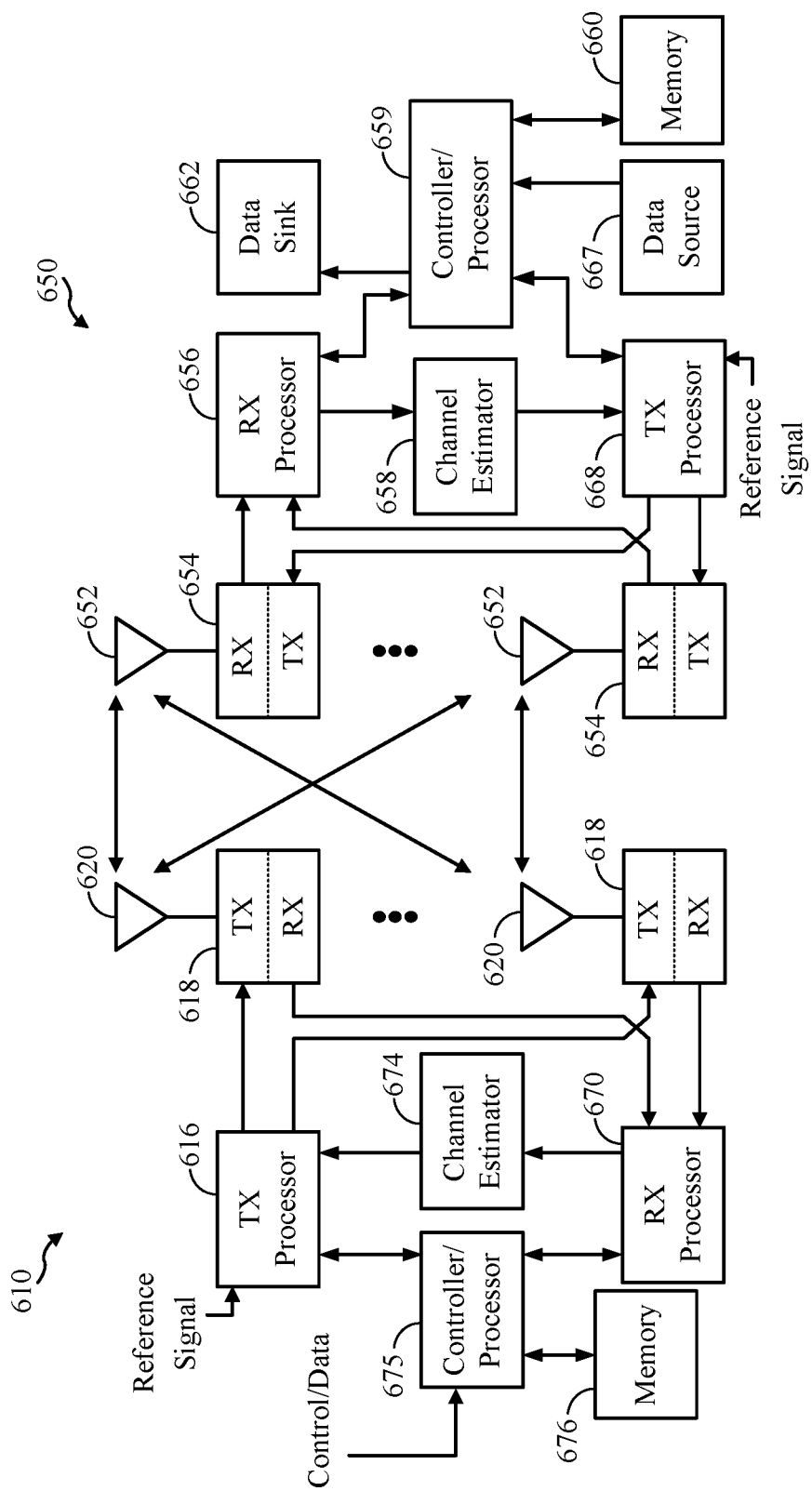
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In certain aspects, a UE (e.g., UE 650) monitors a first set of resources for a first control channel in a first bandwidth region. In response to detecting the first control channel, the UE monitors a second set of resources in a second bandwidth region larger than the first bandwidth region.

In certain aspects, a Base Station (BS) (e.g., eNB 610) transmits control information using at least a first set of resources for a first control channel in a first bandwidth region. The BS transmits, based on the control information, at least one of additional control information or data using a second set of resources in a second bandwidth region larger than the first bandwidth region.

It may be noted that the UE noted above for implementing the flexible bandwidth operation in accordance with certain aspects of the present disclosure may be implemented by a combination of one or more of the controller 659, the RX processor 656, the channel estimator 658 and/or transceiver 654 at the UE 650, for example. Further, the BS may be implemented by a combination of one or more of the controller 675, the TX processor and/or the transceiver 618 at the eNB 610.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656.

The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

Figure 7:
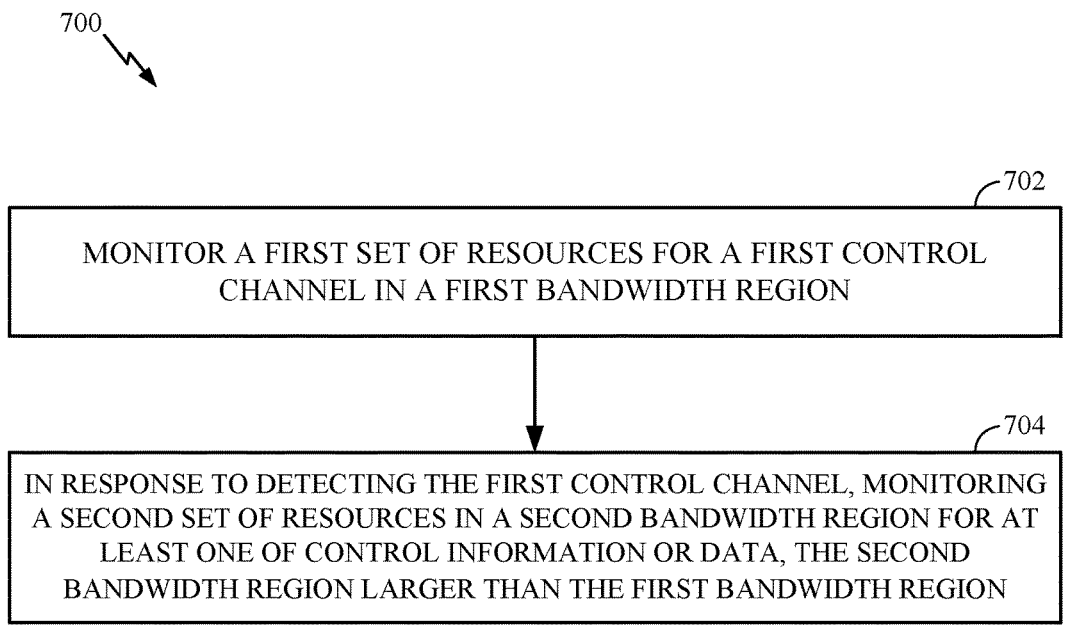
FIG. 7 illustrates example operations that may be performed by a UE for implementing flexible bandwidth operation, in accordance with certain aspects of the present disclosure.

The controller/processor 659 and/or other processors, components and/or modules at the UE 650 may perform or direct operations, for example, operations 700 in FIG. 7, and/or other processes for the techniques described herein for implementing the new transmission scheme. Further, the controller/processor 675 and/or other processors, components and/or modules at the eNB 610 may perform or direct operations, for example, operations 800 in FIG. 8, and/or other processes for the techniques described herein for implementing the new transmission scheme. In certain aspects, one or more of any of the components shown in FIG. 6 may be employed to perform example operations 700 and 800, and/or other processes for the techniques described herein. The memories 660 and 676 may store data and program codes for the UE 650 and eNB 610 respectively, accessible and executable by one or more other components of the UE 650 and the eNB 610.

Example Techniques for Flexible Bandwidth Operation

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications (MTC). MTC generally refers to technologies or devices, such as UEs that communicate without human intervention. For example, MTC may refer to communication involving at least one remote device on at least one end of the communication and may include forms of data communication which involve one or more entities that do not necessarily need human interaction.

For MTC or low cost UEs, generally referred to as MTC UEs, various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 1000 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 μs for regular UEs to 1 ms for MTC UEs. MTC UEs may still monitor downlink (DL) control channels in the same way as regular UEs, for example, monitor for wideband control channels in the first few symbols (e.g., PDCCH) as well as narrowband control channels occupying a relatively narrowband, but spanning a length of a subframe (e.g., ePDCCH).

Certain standards (e.g., LTE Release 13) introduce support for various additional MTC enhancements, referred to as enhanced or evolved MTC (eMTC). eMTC in a wireless system may allow narrowband MTC devices to effectively operate within wider system bandwidths (e.g., 1.4/3/5/10/15/20 MHz). For example, an MTC device may support 1.4 MHz bandwidth (i.e., 6 resources blocks). In some instances, coverage enhancements of such MTC devices may be achieved by power boosting (e.g., of up to 15 dB).

By way of example, while some devices (e.g., UEs or MTC devices) may have broadband capacity, other devices may be limited to narrowband communications. This narrowband limitation may, for example, interfere with the ability of a device to receive control channel information using the full bandwidth served by a base station. In some wireless communication systems, such as Long Term Evolution (LTE), an MTC device having limited bandwidth capability (or another device with similar capabilities) may be referred to as a category 0 device.

A UE, which may be an MTC device or another UE that supports narrowband operation, may establish a connection with another wireless node using a narrowband control region of a wideband system. For example, a conventional legacy control region (e.g., PDCCH) may span the system bandwidth for a first few symbols, while a narrowband region of the system bandwidth (e.g., spanning a narrow bandwidth portion of a data region) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 physical resource blocks (PRBs).

As mentioned above, MTC and/or eMTC operation may be supported in a wireless communication network in coexistence with LTE or some other RAT. For example, subframes associated with MTC and/or eMTC operation may be time division multiplexed (TDM) with regular subframes associated with LTE (or some other RAT). Further, one or more narrowband regions used by MTC UEs or eMTC UEs may be frequency division multiplexed (FDM) within a wider bandwidth supported by LTE. Multiple narrowband regions, with each narrowband region spanning a bandwidth that is no greater than a total of 6RBs, may be supported for MTC and/or eMTC operation. In some cases, each MTC UE or eMTC UE may operate within one narrowband region (e.g., at 1.4 MHz or 6RBs) at a time. However, the UEs, at any given time, may re-tune to other narrowband regions in the wider system bandwidth. In some cases, multiple MTC or eMTC UEs may be served by different narrow band regions (e.g., with each narrowband region spanning 6 RBs). In yet other examples, different combinations of eMTC UEs may be served by one or more same narrowband regions and/or one or more different narrowband regions.

In some cases, to enhance coverage for MTC and/or eMTC devices, "bundling" may be utilized in which certain transmissions are sent as a bundle of transmissions, for example, with the same information transmitted over multiple subframes.

Another class of devices that support and implement narrow band operation are devices that implement Narrow-Band Internet-of-Things (NB-IoT).

The Internet-of-Things (IoT) is a network of physical objects or "things" embedded with, for example, electronics, software, sensors, and network connectivity, which enable these objects to collect and exchange data. IoT allows objects to be sensed and controlled remotely across existing network infrastructure, creating opportunities for more direct integration between the physical world and computer-based systems, and resulting in improved efficiency, accuracy and economic benefit. When IoT is augmented with sensors and actuators, the technology becomes an instance of the more general class of cyber-physical systems, which also encompasses technologies such as smart grids, smart homes, intelligent transportation and smart cities. Each "thing" is generally uniquely identifiable through its embedded computing system but is able to interoperate within the existing Internet infrastructure.

Narrow-Band IoT (NB-IoT) is a technology being standardized by the 3GPP standards body. This technology is a narrowband radio technology specially designed for the IoT, hence its name. Special focuses of this standard are on indoor coverage, low cost, long battery life and large number of devices. The NB-IoT technology may be deployed "in-band", utilizing resource blocks within, for example, a normal long term evolution (LTE) spectrum or Global System for Mobile communications (GSM) spectrum. In addition, NB-IoT may be deployed in the unused resource blocks within a LTE carrier's guard-band, or "standalone" for deployments in dedicated spectrum.

To reduce the complexity of UEs, NB-IoT may allow for deployments utilizing one Physical Resource Block (PRB) (180 kHZ+20 kHZ guard band). NB-IoT deployments may utilize higher layer components of LTE and hardware to allow for reduced fragmentation and cross compatibility with, for example, NB-LTE and eMTC (enhanced or evolved Machine Type Communication(s)).

NB-IoT may operate in a narrow band of 180 kHz, with new primary synchronization sequence (PSS), secondary synchronization sequence (SSS), physical broadcast channel (PBCH), physical random access channel (PRACH), physical downlink shared channel (PDSCH), and physical uplink shared channel (PUSCH), and may have a single tone uplink (UL). NB-IoT may have extended coverage by use of transmission time interval (TTI) bundling, and have a simplified communication protocol. NB-IoT defines new downlink control, data and reference signal that fit in 1RB.

In some cases, certain devices, which generally operate in narrowband (e.g., eMTC, NB-IoT type devices), may require higher data rates not achievable in narrowband operation. An example of such a use case may include voice applications which generally require higher bandwidth. However, higher data rates (e.g., as supported in wideband operation) generally come at the expense of higher device complexity and higher power consumption. In certain aspects, while for some of these devices (e.g., wearable devices such as high end watches) complexity may not be an issue, power consumption may be a limiting factor. In an aspect, from power consumption perspective, it is be better for a device to support higher data rates and go to sleep earlier. In some cases, certain devices that support wideband operation (e.g. smartphone) may move to narrowband operation to extend battery life, but may still require supporting higher data rates.

In certain aspects, the power consumption of a UE may be driven by the time the UE spends monitoring the control channel. For example, a UE may spend a high percentage of its time monitoring the control channel without any assignment. Examples of such monitoring include monitoring the control channel during (Discontinuous Reception) DRX cycles and for paging. To perform this monitoring of the control channel, the UE may incur unnecessary power consumption. For example, during wideband operation, the UE may have to monitor the entire bandwidth (e.g., 20 MHz) to decode PDCCH even when the UE may not have any assignment. Another example of unnecessary power consumption is when the UE has two or more of its RX antennas turned on even in good coverage to monitor the control channel, when it may not be necessary to have multiple antennas turned on.

Certain aspects of the present disclosure discuss techniques to enable devices (e.g., UEs) to achieve higher data rates while keeping the power consumption to a minimum. Some of these techniques discuss flexible bandwidth change, including a device switching between different bandwidth sizes on a need basis. For example, a device may operate in a narrowband mode (e.g., 6 RBs in eMTC mode) while monitoring for a control channel to save power, and may switch to a wideband mode (e.g., 50RBs or any predefined bandwidth) to receive data at higher data rates. Accordingly, such techniques provide an acceptable tradeoff between power consumption and performance of the devices, by avoiding unnecessary power wastage while monitoring for the control channel and allowing for higher bandwidth (e.g., supporting a higher data rate) operation only when it is needed. In certain aspects, for additional power savings a device may turn off one or more RX antennas when operating in a narrowband mode and turn the antennas back on for operating in a wideband mode.

In certain aspects, the bandwidth switching may be implemented in several ways. In certain aspects, semi-static bandwidth switching may be implemented. This may include a base station (e.g., eNB) configuring a particular bandwidth for a UE and the UE following the configured bandwidth. This may include the eNB signaling a configured bandwidth to be used by the UE via RRC signaling. While the semi-static bandwidth switching may be enough for some applications (e.g., VOIP), it may not be appropriate for dynamic changing of bandwidth.

In certain aspects, dynamic bandwidth switching may be implemented. The dynamic bandwidth switching may include dynamic explicit signaling including the base station explicitly signaling the UE (e.g., via Downlink Control Information, DCI) to switch between bandwidths (e.g., narrow and wide bandwidths). This may be similar to Semi Persistent Scheduling (SPS) activation/deactivation. The dynamic bandwidth switching may also include dynamic implicit signaling. This may be a DRX-like operation including the UE using a lower bandwidth (and e.g., 1RX antenna) when monitoring a control channel in DRX-ON cycle, and moving to wideband operation (and e.g., more RX antennas) when the UE receives PDSCH grant. In an aspect, a combination of the semi-static bandwidth switching and dynamic bandwidth switching may be used. For example, semi-static switching may be used for SPS and dynamic switching may be used for dynamically scheduled PDSCH.

In certain aspects, cross-subframe scheduling may be used for narrowband operation and same subframe scheduling may be used for wideband (or larger bandwidth) operation.

FIG. 7 illustrates example operations 700 that may be performed by a UE for implementing flexible bandwidth operation, in accordance with certain aspects of the present disclosure. Operations 700 begin, at 702, by the UE monitoring a first set of resources for a first control channel in a first bandwidth region. At 704, the UE, in response to detecting the first control channel, monitors a second set of resources in a second bandwidth region for at least one of control information or data, the second bandwidth region larger than the first bandwidth region. In an aspect, the monitoring the second set of resources for the control information comprises monitoring the second set of resources for a second control channel for receiving the control information scheduling resources for receiving the data. In an aspect, the first bandwidth region may be a preconfigured narrowband and the second bandwidth may be a preconfigured wideband or any other larger bandwidth supported by the UE. In an aspect, the first control channel includes a control channel associated with narrowband operation (e.g., mPDCCH used for eMTC).

In an aspect, if the first control channel provides an indication that the second set of resources (or resources contained in the second set of resources) are assigned for receiving data, the UE monitors the portion of the second set of resources indicated by the first control channel for receiving the data. In an aspect, if the control channel provides an indication to monitor (e.g., switch to) the second bandwidth region, the UE monitors the second set of resources for a second control channel (e.g., PDCCH, EPDCCH or another control channel associated with wideband operation) for receiving control information scheduling resources for receiving data.

Figure 8:
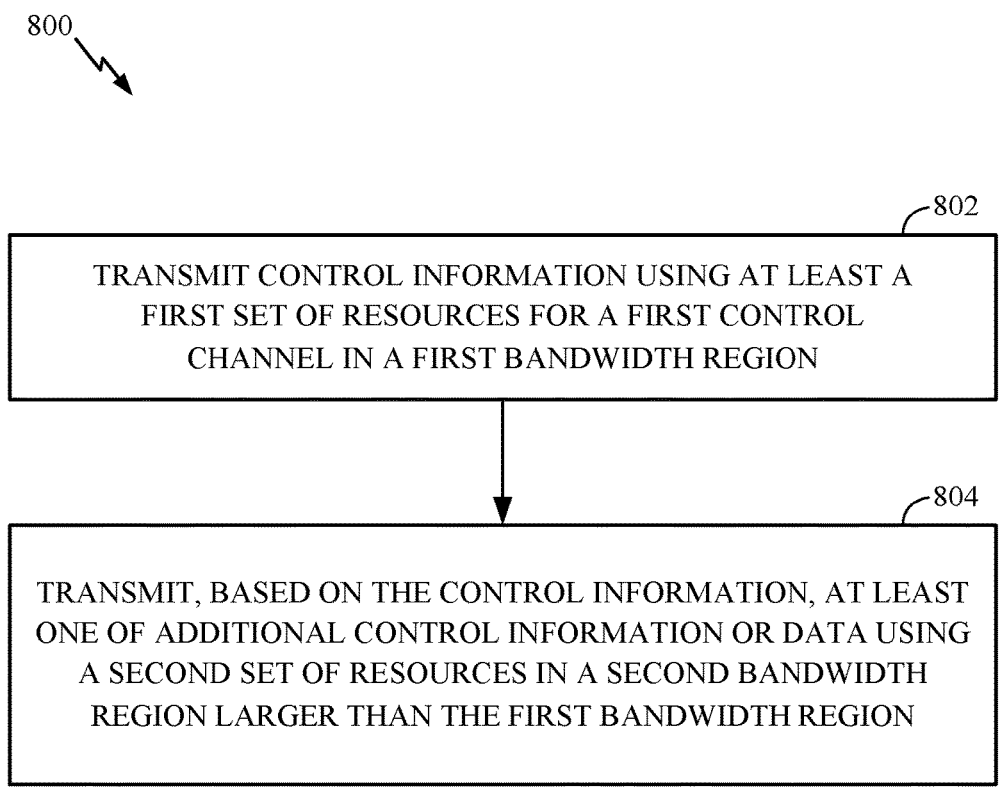
FIG. 8 illustrates example operations that may be performed by a BS (e.g, eNB) for implementing flexible bandwidth operation, in accordance with certain aspects of the present disclosure.

FIG. 8 illustrates example operations 800 that may be performed by a BS (e.g, eNB) for implementing flexible bandwidth operation, in accordance with certain aspects of the present disclosure. Operations 800 begin, at 802, by transmitting control information using at least a first set of resources for a first control channel in a first bandwidth region. At 804, the BS transmits, based on the control information, at least one of additional control information or data using a second set of resources in a second bandwidth region larger than the first bandwidth region. In an aspect, the first bandwidth region may be a preconfigured narrowband and the second bandwidth may be a preconfigured wideband or any other larger bandwidth supported by the UE. In an aspect, the first control channel includes a control channel associated with narrowband operation (e.g., mPDCCH used for eMTC).

In an aspect, if the control information transmitted in the first control channel provides an indication that the second set of resources (or resources contained in the second set of resources) is assigned for receiving data, the BS transmits data on at least the portion of the second set of resources indicated as assigned for data in the control information. In an aspect, if the control information provides an indication to monitor the second bandwidth, the BS transmits additional control information using at least a portion of the second set of resources for a second control channel (e.g., PDCCH or another control channel associated with wideband operation), the additional control information scheduling resources for transmitting data. In certain aspects, the additional control information may be multiplexed in the time domain with the data (similar to PDCCH operation) or in the frequency domain (similar to EPDCCH or MDPCCH).

Figure 9:
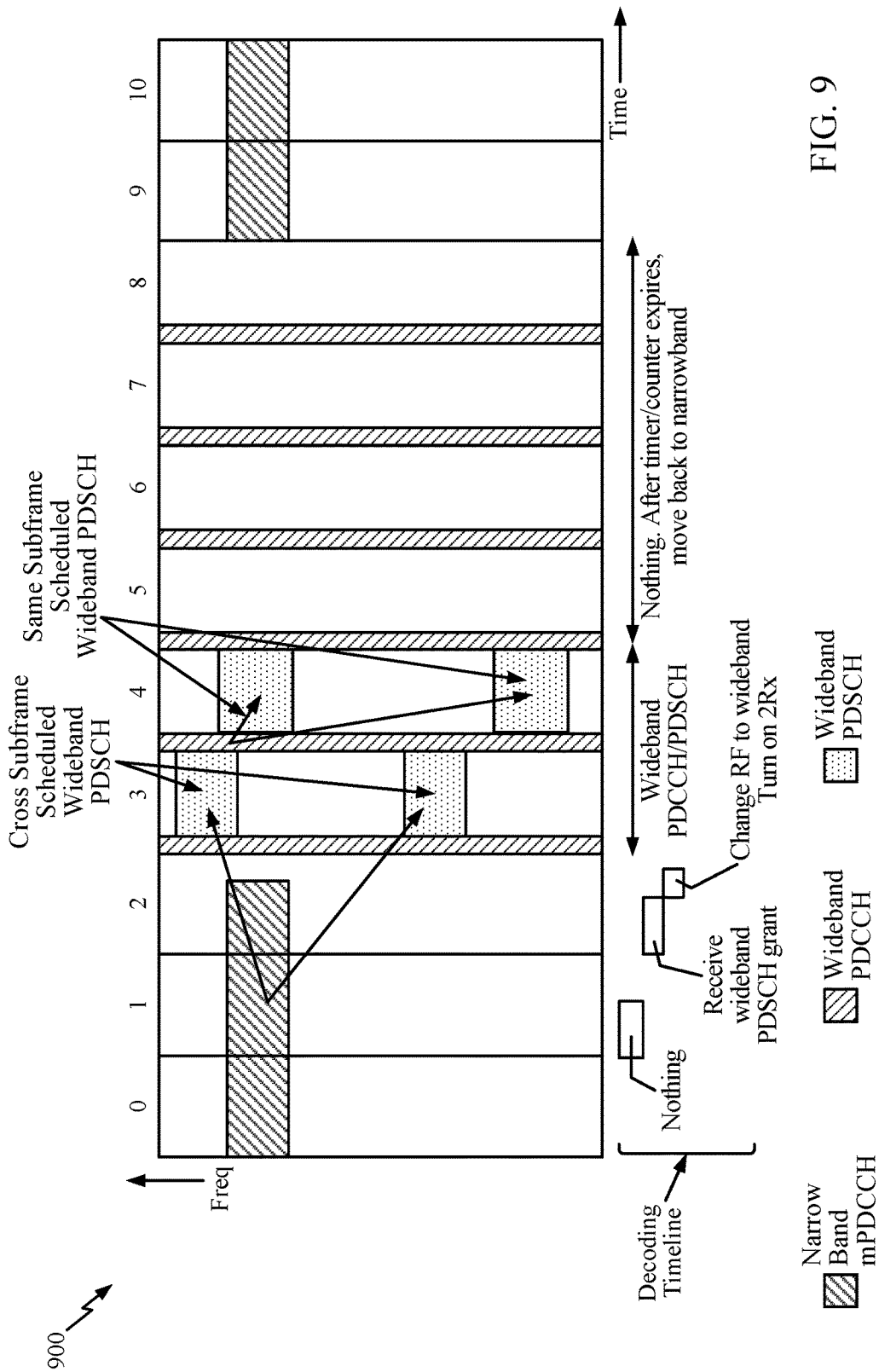
FIG. 9 illustrates an example timeline for implementing flexible bandwidth operation by dynamic implicit signaling, in accordance with certain aspects of the present disclosure.

FIG. 9 illustrates an example timeline 900 for implementing flexible bandwidth operation by dynamic implicit signaling, in accordance with certain aspects of the present disclosure. FIG. 9 illustrates communication between a BS and a UE over a number of consecutive subframes 0-10 over a period of time. In an aspect, the UE may be configured to operate in a narrowband mode (e.g., eMTC) by default until switching to a wideband mode (e.g, legacy LTE) is required to receive data. As shown, during subframes 0-2, to conserve power, the UE operates in a narrowband mode and monitors narrowband resources for a control channel (e.g., mPDCCH)

in a narrowband region. In addition, the UE may be configured to operate a reduced number of antennas (e.g., 1 RX antenna) while monitoring in the narrowband mode.

The UE detects a data grant (e.g., wideband PDSCH grant) in subframe 2 and switches to a wideband mode (e.g, LTE) of operation to receive data scheduled by the data grant at higher data rates. In addition, the UE may be configured to turn on one or more additional RX antennas for the wideband operation. In an aspect, the data grant includes information regarding resources that are scheduled for receiving data. In subframe 3, the UE monitors the resources indicated as scheduled for receiving data and receives data. Thus, the data in the first subframe after the UE switches from the narrowband to the wideband mode is cross-subframe scheduled as the data is scheduled in the subframe by a data grant in another subframe. As noted above, subframe 2 schedules data resources in subframe 3. Now that the UE is operating in wideband mode, the UE may monitor a wideband control channel (e.g., PDCCH, EPDCCH or MPDCCH with wideband assignments) and the data may be same subframe scheduled. For example, as shown in FIG. 9, UE monitors the PDCCH in subframe 4 to receive a data grant scheduling data resources in subframe 4.

In an aspect, if the UE does not receive a grant for a given period of time (e.g., before a preconfigured counter/timer expires) the UE switches back to the narrowband mode of operation to conserve power. As shown in FIG. 9, the UE does not receive a grant in subframes 5-8, and in response, switches back to a narrowband mode in subframes 9 and 10. In addition, the UE may turn off one or more antennas for the narrowband monitoring to conserve power.

Figure 10:
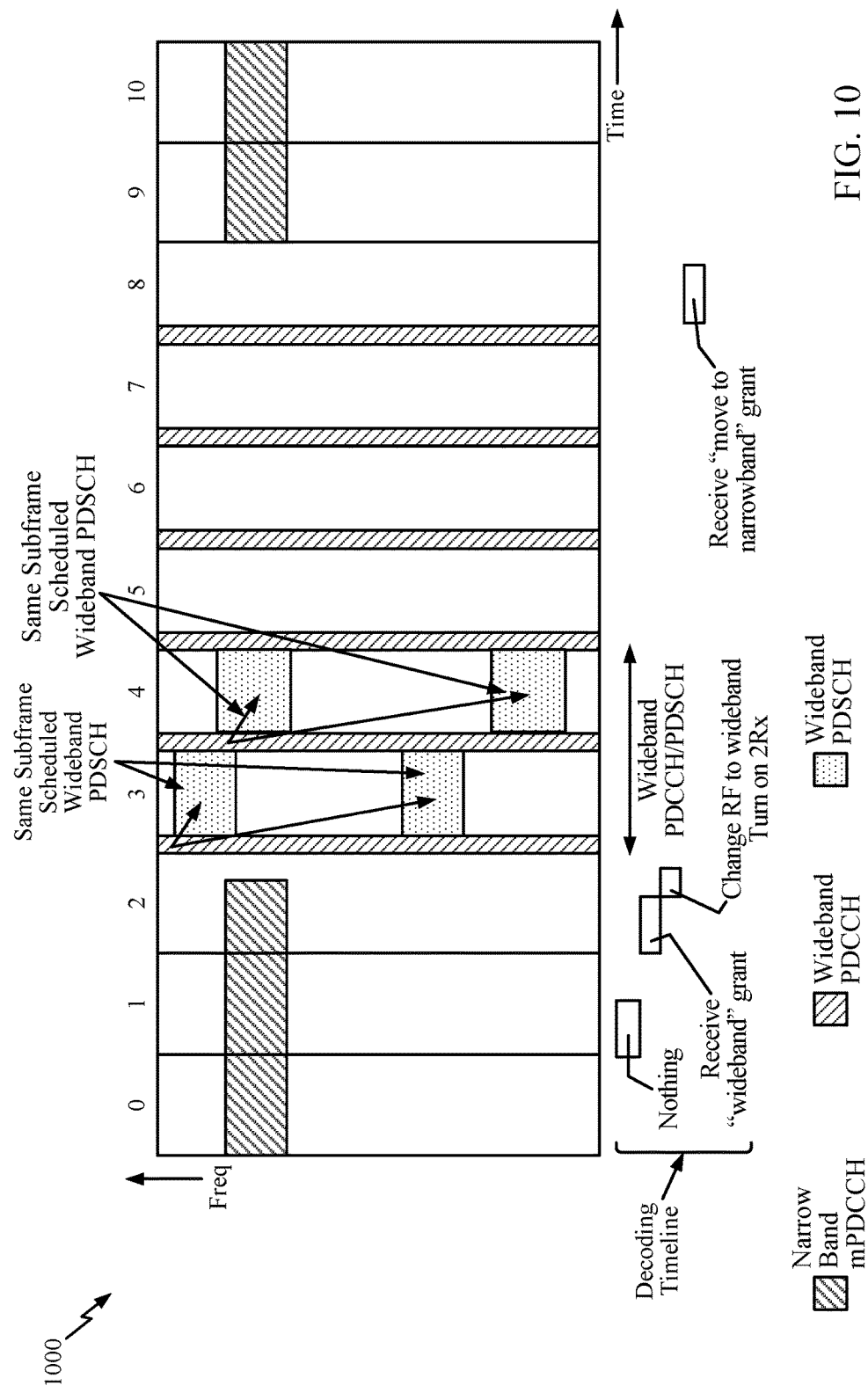
FIG. 10 illustrates an example timeline for implementing flexible bandwidth operation by dynamic explicit signaling, in accordance with certain aspects of the present disclosure.

FIG. 10 illustrates an example timeline 1000 for implementing flexible bandwidth operation by dynamic explicit signaling, in accordance with certain aspects of the present disclosure. FIG. 10 illustrates communication between a BS and a UE over a number of consecutive subframes 0-10 over a period of time. As discussed above, the UE may be configured to operate in a narrowband mode (e.g., eMTC) by default until switching to a wideband mode (e.g., legacy LTE, or eMTC with increased bandwidth) is required to receive data. As shown, during subframes 0-2, to conserve power, the UE operates in a narrowband mode and monitors narrowband resources for a control channel (e.g., mPDCCH) in a narrowband region. In addition, the UE may be configured to operate a reduced number of antennas (e.g., 1 RX antenna) while monitoring in the narrowband mode.

The UE detects a wideband grant in subframe 2 (received in the narrowband search space) and switches to a wideband mode of operation (e.g, LTE) to receive the data at higher data rates. In addition, the UE may be configured to turn one or more additional antenna for the wideband operation. In an aspect, the wideband grant may be as simple as an indication for the UE to switch to a wideband mode and does not include any data grant. Once the UE switches to the wideband mode, the UE may monitor a wideband control channel (e.g., PDCCH, EPDCCH or MPDCCH with wideband assignments) to receive data grants scheduling resources for receiving data. As shown, the UE monitors PDCCH in subframe 3 to receive data grant scheduling resources for data in the same subframe. Similarly the UE monitors PDCCH in subframe 4 to receive data grant scheduling resources for data in subframe 4. Thus, as the wideband grant received in subframe 2 does not have any data grant the first data grant does not have to be cross-subframe scheduled.

As shown, at subframe 8, the UE receives another grant indicating the UE to switch back to the narrowband mode. In response, the UE switches to the narrowband mode and starts monitoring the narrowband control channel in subframes 9 and 10. In addition, the UE may turn off one or more antennas for the narrowband monitoring to conserve power.

It may be noted that while the data grants in the wideband mode do not have to be cross subframe scheduled, they may be scheduled by cross-subframe scheduling if needed.

In certain aspects, a device (e.g., UE) may not be capable of receiving/decoding a wideband control channel configured for a wideband network. For example, a UE (e.g., certain high end eMTC devices) may support a maximum bandwidth (e.g., predefined bandwidth) and a reduced bandwidth. In an aspect, if the UE supports a maximum bandwidth lower than the legacy 20 MHz bandwidth (e.g., 5 MHz), the UE may not be able to decode the PDCCH after switching from its narrowband (reduced bandwidth) to its wideband (5 MHz). In such cases, the UE may continue to monitor the narrowband control channel (e.g., mPDCCH) even after the wideband switch for data grants scheduling data in the UE's wideband range (e.g., 5 MHz).

Figure 11:
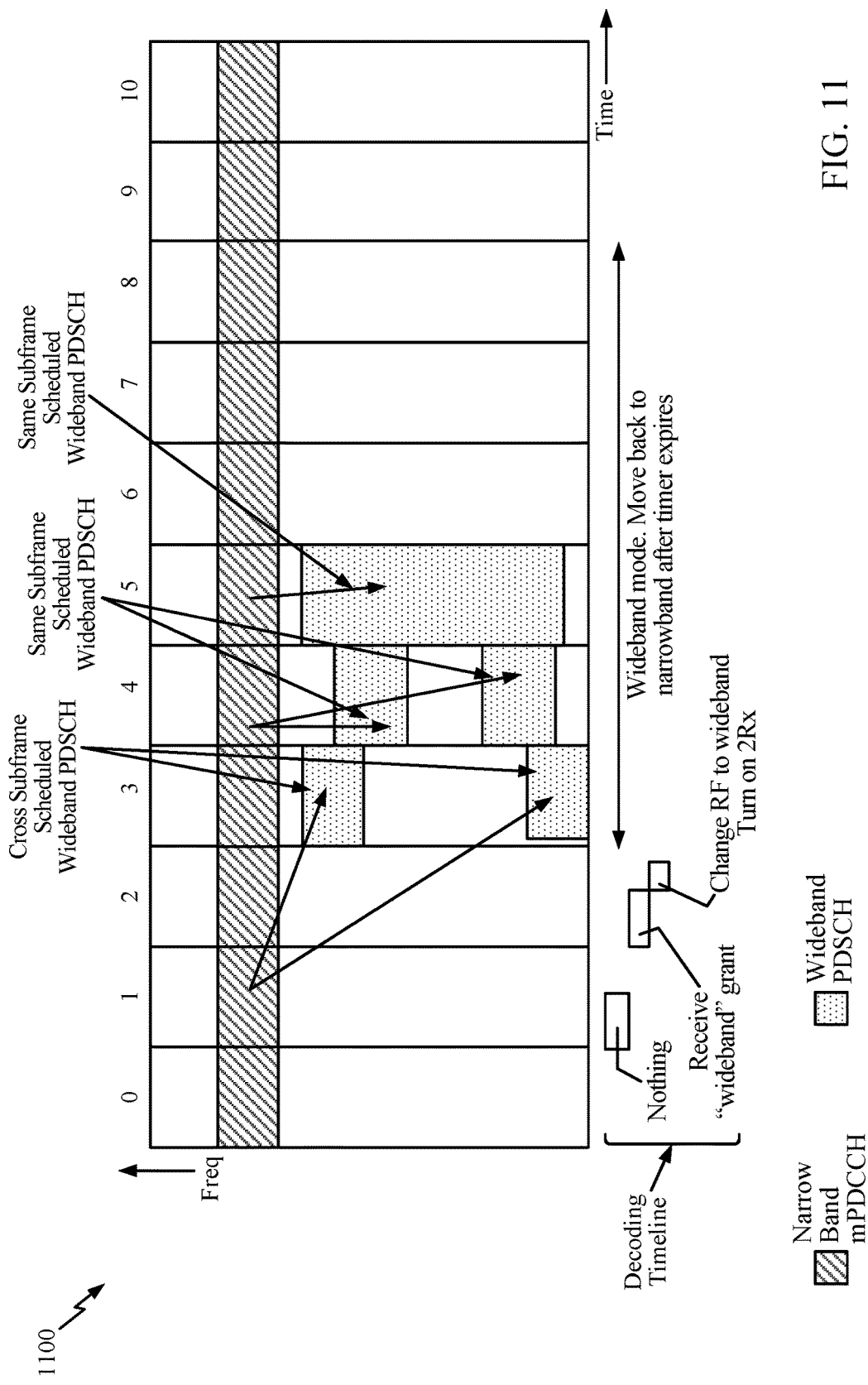
FIG. 11 illustrates an example timeline for implementing flexible bandwidth operation for devices capable of decoding narrowband control channels only, in accordance with certain aspects of the present disclosure.

FIG. 11 illustrates an example timeline 1100 for implementing flexible bandwidth operation for devices capable of decoding narrowband control channels only, in accordance with certain aspects of the present disclosure.

FIG. 11 illustrates communication between a BS and a UE over a number of consecutive subframes 0-10 over a period of time. The UE supports a maximum wide bandwidth (e.g., 5 MHz) and a reduced or narrow bandwidth (e.g., 6RBs like eMTC). As discussed above, the UE may be configured to operate in a narrowband mode (e.g., eMTC) by default until switching to a wideband mode (e.g., maximum bandwidth of 5 MHz) is required to receive data. As shown, during subframes 0-2, to conserve power, the UE operates in a narrowband mode and monitors narrowband resources for a control channel (e.g., mPDCCH) in a narrowband region. In addition, the UE may be configured to operate a reduced number of antennas (e.g., 1 RX antenna) while monitoring in the narrowband mode.

The UE detects a wideband data grant in subframe 2 and switches to a wideband mode (e.g., maximum bandwidth of 5 MHz) of operation to receive the data at higher data rates. In addition, the UE may be configured to turn on one or more additional RX antennas for the wideband operation. In an aspect, the wideband data grant includes information regarding wideband resources scheduled for data. Thus, once the UE switches to the wideband mode, it monitors the wideband data resources indicated in the data grant to receive the scheduled data. As shown, the UE monitors wideband resources in subframe 3 indicated as scheduled for receiving data by the grant received in subframe 2 and receives the data. As noted previously, the first data grant received in the narrowband control channel (e.g., mPDCCH) is cross subframe scheduled.

As discussed above, since the UE supports a maximum bandwidth of 5 MHz, the UE is unable to monitor the 20 MHz bandwidth for the legacy LTE PDCCH. Thus, once the UE switches to the wideband mode (e.g., 5 MHz), the UE may continue to monitor the narrowband control channel (e.g., mPDCCH) to receive data grants scheduling resources for receiving data. Further, these data grants may be same subframe scheduled. As shown, the UE monitors mPDCCH in subframe 4 to receive data grant scheduling resources for data in the same subframe. Similarly the UE monitors mPDCCH in subframe 5 to receive data grant scheduling resources for data in subframe 4.

In an aspect, if the UE does not receive a grant for a given period of time (e.g., before preconfigured counter/timer expires) the UE switches back to the narrowband mode of operation to conserve power. As shown in FIG. 11, the UE does not receive a grant in subframes 5-8, and in response, switches back to a narrowband mode in subframes 9 and 10. In addition, the UE may turn off one or more antennas for the narrowband monitoring to conserve power.

In certain aspects, in addition to monitoring the narrowband control channel (e.g., mPDCCH) as shown in FIG. 11, the UE may monitor an additional narrowband control channel (e.g., additional mPDCCH), for example, in the wideband region or a wideband control channel (e.g., PDCCH, EPDCCH).

Figure 12:
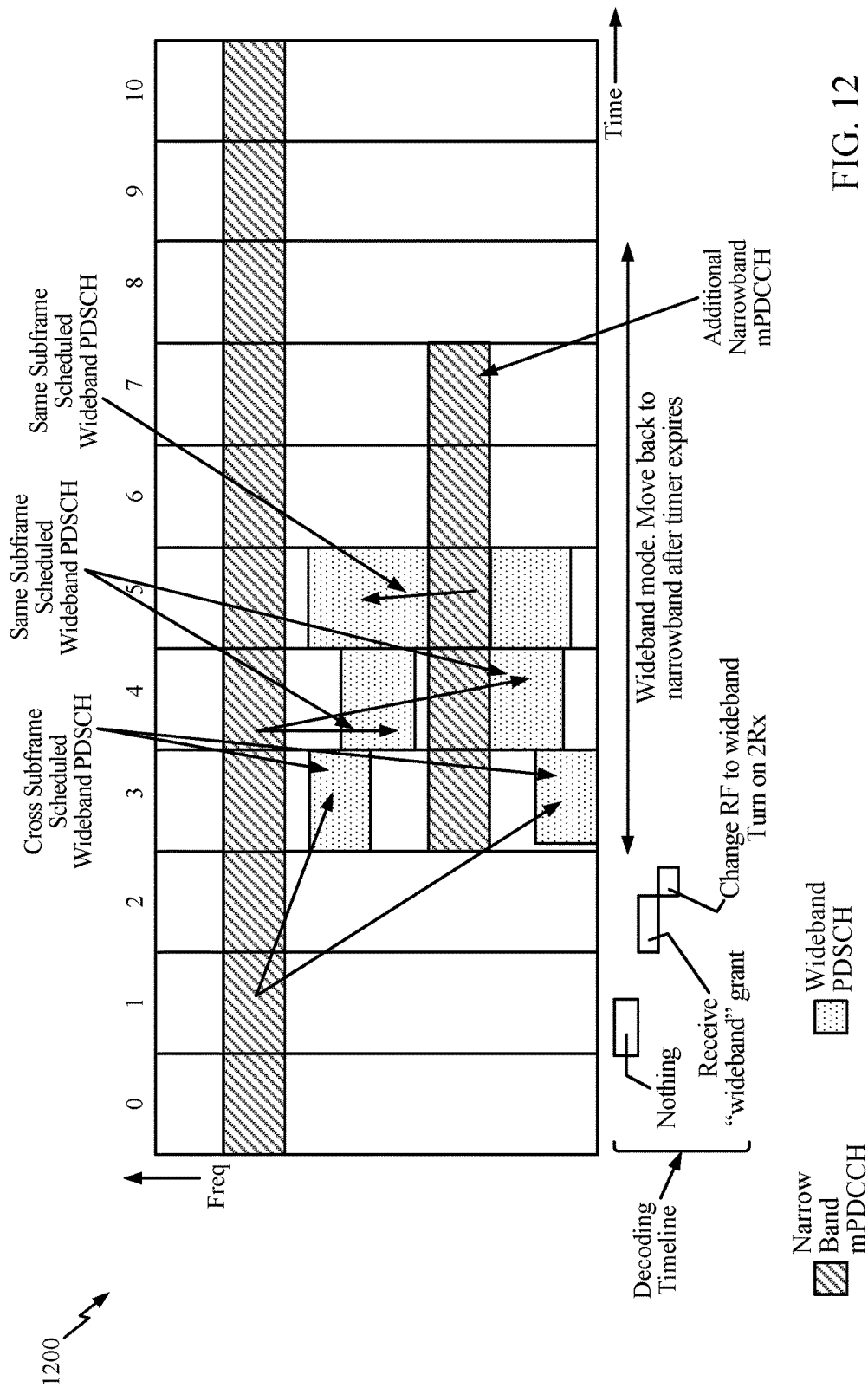
FIG. 12 illustrates an example timeline for implementing flexible bandwidth operation for devices capable of decoding narrowband control channels only, in accordance with certain aspects of the present disclosure.

FIG. 12 illustrates an example timeline 1200 for implementing flexible bandwidth operation for devices capable of decoding narrowband control channels only, in accordance with certain aspects of the present disclosure.

As shown in FIG. 12, once the UE receives the wideband data grant in subframe 2, it continues to monitor the narrowband control channel (e.g., mPDCCH) it was monitoring before switching, and additionally starts monitoring an additional narrowband control channel (e.g., additional mPDCCH) in the wideband region. As shown, after the wideband switching, the UE may receive data grants from either of the two narrowband control channels, or from a search space spanning both control channels. For example, in subframe 4, the UE receives a data grant from the upper narrowband control channel, and in subframe 5, receives a data grant from the additional narrowband control channel in the wideband region.

In certain aspects, if the UE misses initial grant (e.g., received before switching to the wideband mode) it may be out of sync with the BS, since for example, the BS may expect that the UE has switched to the wideband mode while the UE is still in narrow band mode. In certain aspects, the BS may send 1 bit information in a grant (e.g., every grant) signaling whether the grant implements same or cross subframe scheduling. For example, as discussed above once the UE has switched to a wideband mode after decoding the initial grant, the second and subsequent grants may implement same subframe scheduling. If the UE misses its first grant it may be expecting cross subframe scheduling in the second grant, which may be the first grant it receives successfully, while the second grant may implement same subframe scheduling. The 1 bit information tells the UE what type of scheduling to use for monitoring and decoding data.

In certain aspects, semi-static signaling of subframes for MPDCCH and PDCCH may be implemented. A UE may switch to monitor MPDCCH or PDCCH based on the signaling. In an aspect, EPDCCH may be reused, and it may be left to the UE implementation to perform narrowband demodulation (if possible) or wideband processing. In this case, the PDSCH may have to be cross-subframe scheduled.

In certain aspects, CSI measurements may have to be modified for the period of narrowband (plus reduced RX antenna) operation, as a result of limited measurements in this mode.

It may be noted that any narrowband control channel supported by the BS and the UE may be used for the narrow band monitoring discussed above. For example, NB-PDCCH may be used for the narrowband monitoring.

In an aspect, when a UE is operating in the narrowband mode, it follows SIB1 indication for the number of control symbols. When the US is operating in the wideband mode it may follow PCFICH for the number of control symbols.

Certain additional procedures may be defined for idle-mode operation. For example, the UE signals a capability indicating that it is able to monitor narrowband MPDCCH and receive wideband PDSCH. Base stations may implement the above discussed techniques for flexible bandwidth operation for each UE based on the indication of capability received from the UE. In certain aspects, while monitoring for paging, the UE behavior may depend on the cell it is camped on. For example, if the cell supports narrowband signaling, the UE camps on the cell monitoring mPDCCH. The PDSCH assignment may be wideband or narrowband. In this case mPDCCH paging may be different for eMTC UEs and for UEs supporting flexible bandwidth switching in accordance with aspects of the present disclosure. For example, different narrow bands may be implemented with no need for coverage enhancement.

In certain aspects, for smartphone/wearable device applications that support Rel-13 eMTC as well as higher category, the MME may store the capability of the UEs for flexible bandwidth switching. This way, the UE does not need to re-register with the network every time coverage enhancement changes. In an aspect, the UE monitors mPDCCH or PDCCH depending on the coverage enhancement level. In an aspect, the network may page the UE in both mPDCCH and PDCCH. This may be useful if the UE has to switch to legacy PDCCH due to coverage or interference issues.

It may be noted that the techniques discussed herein are applicable to any type of device capable of narrowband operation (e.g., MTC, eMTC, NB-IoT) and wideband operation (e.g., legacy LTE). Further, the terms "narrowband" and the "wideband" may not correspond to exact values defined for narrowband operation and wideband operation respectively in one or more standards (e.g., 3GPP standards). The bandwidth ranges for narrowband and wideband operation may be set by a network administrator. Thus, the techniques discussed herein are applicable to any device capable of operating in two or more different bandwidth ranges set by a network administrator in a wireless communication network.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communication by a User Equipment (UE), comprising:
    monitoring a first set of resources in a first subframe for a first control channel in a narrow bandwidth region, wherein the first set of resources occupy a first number of symbols of the first subframe;
    switching to a wide bandwidth region for monitoring a second set of resources in a second subframe for a second control channel in the wide bandwidth region, the second set of resources occupying a second number of symbols of the second subframe, wherein the first number of symbols is larger than the second number of symbols; and
    receiving data in the wide bandwidth region on the resources scheduled by the control information.

2. The method of claim 1, wherein monitoring the second set of resources for the data comprises monitoring a third set of resources contained within the second set of resources for the data based on an indication received in the first control channel that the third set of resources is assigned for receiving the data.

3. The method of claim 1, wherein the first control channel provides an indication to monitor the second bandwidth region.

4. The method of claim 1, wherein the first control channel comprises a Machine Type Communications (MTC) Physical Downlink Control Channel (mPDCCH) and wherein the second control channel comprises a Physical Downlink Control Channel (PDCCH).

5. The method of claim 1, further comprising monitoring the first set of resources for the first control channel in the first bandwidth region in response to not receiving transmission on the second set of resources for a given period of time.

6. The method of claim 1, further comprising:
    receiving, in the second bandwidth region, an indication to monitor the first set of resources for the first control channel in the first bandwidth region; and
    in response, monitoring the first set of resources for the first control channel in the first bandwidth region.

7. The method of claim 1, wherein the second bandwidth region comprises at least a portion of the first bandwidth region and the second set of resources comprises resources for the first control channel in the portion of the first bandwidth region.

8. The method of claim 7, further comprising:
    receiving control information in the first control channel in the portion of the first bandwidth region, the control information scheduling resources for receiving data in the second bandwidth region.

9. The method of claim 8, further comprising receiving an indication of whether the control information schedules the resources for receiving the data in the same subframe or a different subframe.

10. The method of claim 1, further comprising monitoring the second set of resources for the first control channel and the second control channel to receive additional control information scheduling resources for receiving data in the second bandwidth region.

11. The method of claim 1, wherein the first control channel and the second control channel are of the same type.

12. The method of claim 1, further comprising transmitting an indication that the UE supports monitoring the first set of resources for the first control channel in the first bandwidth region and receiving data in the second bandwidth region.

13. The method of claim 1, further comprising:
    determining that a serving cell supports operation in the first bandwidth region; and
    in response, monitoring the first set of resources for the first control channel in the first bandwidth region for receiving pages while the UE is in an idle mode.

14. The method of claim 1, further comprising:
    determining that a serving cell does not support operation in the first bandwidth region; and
    in response, monitoring for the second control channel in the second bandwidth region for receiving pages while the UE is in an idle mode.

15. A method for wireless communication by a Base Station (BS), comprising:
    transmitting control information using at least a first set of resources in a first subframe for a first control channel in a narrow bandwidth region, wherein the first set of resources occupy a first number of symbols of the first subframe;
    transmitting additional control information using at least a portion of a second set of resources in a second subframe for a second control channel in a wide bandwidth region for scheduling resources for transmitting data, the second set of resources occupying a second number of symbols of the second subframe, wherein the first number of symbols is larger than the second number of symbols; and
    transmitting data in the wide bandwidth region on resources scheduled by the additional control information.

16. The method of claim 15, wherein the control information provides an indication that a third set of resources contained in the second set of resources is assigned for receiving data.

17. The method of claim 15, wherein the control information provides an indication to monitor the second bandwidth region.

18. The method of claim 15, wherein the second control channel comprises a Physical Downlink Control Channel (PDCCH).

19. The method of claim 15, further comprising transmitting an indication to monitor the first set of resources for the first control channel in the first bandwidth region.

20. The method of claim 15, wherein the second bandwidth region comprises at least a portion of the first bandwidth region and the second set of resources comprises resources for the first control channel in the portion of the first bandwidth region.

21. The method of claim 20, further comprising transmitting second control information in the first control channel in the portion of the first bandwidth region, the second control information scheduling resources for transmitting data in the second bandwidth region.

22. The method of claim 21, further comprising transmitting an indication of whether the second control information schedules the resources for transmitting the data in the same subframe or a different subframe.

23. The method of claim 21, further comprising transmitting third control information using the second set of resources for the second control channel in the second bandwidth region.

24. The method of claim 23, wherein the third control information comprises information regarding scheduled data resources in the second bandwidth region.

25. The method of claim 23, wherein the first control channel and the second control channel are of the same type.

26. The method of claim 15, wherein the first control channel comprises a Machine Type Communications (MTC) Physical Downlink Control Channel (mPDCCH).

27. The method of claim 15, further comprising receiving an indication that a User Equipment (UE) supports monitoring the first set of resources for the first control channel in the first bandwidth region and receiving data in the second bandwidth region.

28. An apparatus for wireless communication by a User Equipment (UE), comprising:
    means for monitoring a first set of resources in a first subframe for a first control channel in a narrow bandwidth region, wherein the first set of resources occupy a first number of symbols of the first subframe;
    means for switching to a wide bandwidth region for monitoring a second set of resources in a second subframe for a second control channel in the wide bandwidth region for receiving control information scheduling resources for receiving data in the wide bandwidth region, the second set of resources occupying a second number of symbols of the second subframe, wherein the first number of symbols is larger than the second number of symbols; and
    means for receiving data in the wide bandwidth region on the resources scheduled by the control information.

29. The method of claim 28, wherein the means for monitoring the second set of resources for the data is configured to monitor a third set of resources contained within the second set of resources for the data based on an indication received in the first control channel that the third set of resources is assigned for receiving the data.

30. An apparatus for wireless communication by a Base Station (BS), comprising:
    means for transmitting control information using at least a first set of resources in a first subframe for a first control channel in a narrow bandwidth region, wherein the first set of resources occupy a first number of symbols of the first subframe;
    means for transmitting additional control information using at least a portion of a second set of resources in a second subframe for a second control channel in a wide bandwidth region for scheduling resources for transmitting data, the second set of resources occupying a second number of symbols of the second subframe, wherein the first number of symbols is larger than the second number of symbols; and
    means for transmitting data in the wide bandwidth region on resources scheduled by the additional control information.

* * * * *